US008791207B2

(12) United States Patent
Steelman et al.

(10) Patent No.: US 8,791,207 B2
(45) Date of Patent: Jul. 29, 2014

(54) ADHESIVE COMPOSITION

(75) Inventors: Ronald S. Steelman, Woodbury, MN (US); Michael P. Daniels, Inver Grove Heights, MN (US); David J. Yarusso, Shoreview, MN (US); Craig E. Hamer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 591 days.

(21) Appl. No.: 12/688,476

(22) Filed: Jan. 15, 2010

(65) Prior Publication Data

US 2011/0178250 A1 Jul. 21, 2011

(51) Int. Cl.
*C08L 33/24* (2006.01)
*C08L 33/02* (2006.01)
*C09J 133/24* (2006.01)
*C09J 133/02* (2006.01)

(52) U.S. Cl.
CPC ............ *C09J 133/02* (2013.01); *C08L 2205/02* (2013.01); *C09J 133/24* (2013.01)
USPC ........... 525/218; 525/221; 525/217; 525/203; 428/346; 428/349

(58) Field of Classification Search
CPC ......... C09J 133/02; C09J 133/24; C09J 33/24
USPC ........................................ 525/203, 221, 217
See application file for complete search history.

(56) References Cited

U.S. PATENT DOCUMENTS

| | | | |
|---|---|---|---|
| 4,045,517 A | 8/1977 | Guerin | |
| 4,737,410 A | 4/1988 | Kantner | |
| 4,871,812 A | 10/1989 | Lucast | |
| 5,612,136 A | 3/1997 | Everaerts | |
| 5,660,922 A | 8/1997 | Herridge | |
| 6,288,174 B1 | 9/2001 | Ikegami | |
| 6,447,899 B1 | 9/2002 | Dutton | |
| 6,589,636 B2 | 7/2003 | Emslander | |
| 6,720,387 B1* | 4/2004 | Stark et al. | 525/203 |
| 6,777,053 B1 | 8/2004 | Gunter | |
| 6,800,680 B2* | 10/2004 | Stark et al. | 524/203 |
| 6,844,391 B1 | 1/2005 | Iyer | |
| 6,864,322 B2 | 3/2005 | Gehlsen | |
| 6,919,405 B2* | 7/2005 | Kinning et al. | 525/191 |
| 2004/0127121 A1 | 7/2004 | Schwab | |
| 2004/0241484 A1 | 12/2004 | Uchida | |
| 2006/0234076 A1 | 10/2006 | Takamatsu | |
| 2009/0029160 A1 | 1/2009 | Takamatsu | |
| 2009/0317572 A1 | 12/2009 | Abe | |
| 2010/0022154 A1 | 1/2010 | Wang | |
| 2010/0055418 A1 | 3/2010 | Takamatsu | |
| 2010/0080567 A1 | 4/2010 | McColloch | |
| 2010/0119962 A1 | 5/2010 | Takamatsu | |
| 2010/0255298 A1 | 10/2010 | Abe | |
| 2010/0266859 A1 | 10/2010 | Abe | |
| 2010/0272942 A1 | 10/2010 | Abe | |
| 2010/0323195 A1 | 12/2010 | Furusawa | |

FOREIGN PATENT DOCUMENTS

| | | |
|---|---|---|
| JP | 2562157 | 7/1989 |
| JP | H09-087601 | 3/1997 |
| JP | 10-094595 | 4/1998 |
| JP | 2001-089731 | 4/2001 |
| JP | 2006-241270 | 9/2006 |
| JP | 2007-186577 | 7/2007 |
| JP | 2007-210240 | 8/2007 |
| JP | 2008-055690 | 3/2008 |
| JP | 2009-203370 | 9/2009 |
| JP | 2011-012127 | 1/2011 |
| WO | WO 96-07522 | 3/1996 |
| WO | WO 2004-094549 | 11/2004 |
| WO | WO 2005-023913 | 3/2005 |
| WO | WO 2008-157611 | 12/2008 |
| WO | WO 2008157611 | * 12/2008 |
| WO | WO 2009-018246 | 2/2009 |
| WO | WO 2011-088096 | 7/2011 |

OTHER PUBLICATIONS

SATAS, Handbook of Pressure Sensitive Adhesive Technology, (1982) 8 pages.
International Search Report for PCT/US2011/020957, mailed Sep. 23, 2011, 4 pages.
International Search Report for PCT/US2011/020962, mailed Sep. 28, 2011, 3 pages.

* cited by examiner

*Primary Examiner* — Irina Krylova
(74) *Attorney, Agent, or Firm* — Sandra K. Nowak

(57) ABSTRACT

The present application is directed to a non-aqueous composition. The composition comprises a blend of an acidic copolymer derived from a first group of monomers comprising at least one acidic monomer, and a basic copolymer derived from a second group of monomers comprising at least one basic monomer. The basic copolymer may comprise an amide functionality. In some embodiments, the composition comprises an acidic (meth)acrylic copolymer having a Tg less than 0° C., which is derived from a first group of monomers comprising at least one acidic monomer, and a basic (meth) acrylic copolymer having a Tg less than 0° C., which is derived from a second group of monomers comprising at least one basic monomer. Additionally, the composition may comprise a minimum of 0.10 moles of acid/base pairs per kilogram of composition.

12 Claims, No Drawings

ADHESIVE COMPOSITION

FIELD

The present invention relates to a composition that may be used as a pressure sensitive adhesive.

BACKGROUND

Removable pressure sensitive adhesives (PSA) adhered to a backing, which predictably adhere, yet remain repeatedly peelable from a variety of substrates over a long period of time without damaging or marring the substrate, have many commercial uses. For example, masking tapes, removable labels or office notes, protective films and medical tapes all must quickly adhere to metal, paper, plastics and skin, respectively, but must also peel smoothly away from these varied substrates without leaving behind any adhesive residue on or damaging the surface of a particular substrate.

Ideally, depending on the substrate, the removable adhesive must provide sufficient tack to quickly fix the adhesive to the desired substrate, adequate peel strength to prevent damage of the surface when the adhesive is removed, and have the appropriate cohesive strength to control the transfer of adhesive to the substrate. Cohesive strength must also be controlled so to limit the cold flow of the adhesive on a surface, a process which leads to an undesirable building of peel strength over time.

Typically, the cohesive strength of a PSA may be improved in a variety of ways. For example, cohesive strength may be enhanced through the covalent crosslinking of the adhesive. Some types of chemical crosslinkers are thermally activated and thus cannot be used with hot melt processable PSAs. To covalently crosslink hot melt coated PSAs, one typically must use a post-coating radiation crosslinking process such as one initiated by ultraviolet or electron beam radiation. Such processes require expensive equipment.

It would be beneficial in a hot melt or extrusion process to provide an adhesive that has adequate cohesive strength in the absence of a post-coating crosslinking process.

SUMMARY

It has been desired to create a hot melt coatable pressure sensitive adhesive composition that does not require a secondary crosslinking step, so such adhesives may be used in the manufacture of adhesive articles directly, where the adhesive may be in an interior layer.

The present application is directed to a non-aqueous composition. The composition comprises a blend of an acidic copolymer derived from a first group of monomers comprising at least one acidic monomer and the acidic copolymer is substantially free of basic monomer, and a basic copolymer derived from a second group of monomers comprising at least one basic monomer. The basic copolymer comprises an amide functionality.

In another embodiment, the application is directed to a non-aqueous composition comprising a blend of an acidic copolymer derived from a first group of monomers comprising at least one acidic monomer, and a basic copolymer derived from a second group of monomers comprising at least one basic monomer and the basic copolymer is substantially free of acidic monomer. In such an embodiment, the basic copolymer comprises an amide functionality.

In another embodiment, the application is directed to a non-aqueous pressure sensitive adhesive composition comprising an acidic (meth)acrylic copolymer having a glass transition temperature (Tg) less than 0° C., which is derived from a first group of monomers comprising at least one acidic monomer, and a basic (meth)acrylic copolymer having a Tg less than 0° C., which is derived from a second group of monomers comprising at least one basic monomer. In such an embodiment, the basic copolymer comprises an amide functionality.

In another embodiment, the application is directed to a composition comprising a blend of an acidic copolymer derived from a first group of monomers comprising at least one acidic monomer, and a basic copolymer derived from a second group of monomers comprising at least one basic monomer. The composition comprises a minimum of 0.10 moles of acid/base pairs per kilogram of composition. Additionally, the composition comprises between 10% and 90% by weight of the acidic copolymer and between 10% and 90% by weight of the basic copolymer.

DETAILED DESCRIPTION

As used in the present invention, an "acidic copolymer" is a polymer that has an electron accepting group and may be derived from at least one acidic monomer and may have at least one non-acidic copolymerizable monomer (i.e., a monomer that can not be titrated with a base). In one embodiment, at least one copolymerizable monomer is a (meth)acrylate monomer such as an alkyl (meth)acrylate monomer. The acidic copolymer may optionally be derived from other copolymerizable monomers, such as vinyl monomers and basic monomers, as long as the resultant copolymer can still be titrated with a base. Thus, usually more acidic monomers are utilized to prepare the acidic copolymers than basic monomers. In some embodiments, the acidic copolymer is substantially free of basic monomer. For the purpose of the present application, the acidic copolymer is substantially free of basic monomer if it has less than 0.5% by weight basic monomer in the chain, for example 0%.

A "basic copolymer" is a polymer that has an electron donating group and may be derived from at least one basic monomer and may have at least one nonbasic copolymerizable monomer (i.e., a monomer that cannot be titrated with an acid). Other monomers can be copolymerized with the basic monomers (e.g., acidic monomers, vinyl monomers, and (meth)acrylate monomers), as long as the basic copolymer retains its basicity (i.e., it can still be titrated with an acid). In one embodiment, at least one copolymerizable monomer is a (meth)acrylate monomer such as an alkyl (meth)acrylate monomer. In some embodiments, the basic copolymer is substantially free of acidic monomer For the purpose of the present application, the basic copolymer is substantially free of acidic monomer if it has less than 0.5% by weight acidic monomer in the chain, for example 0%.

Generally, the acidic and the basic copolymers have a low Tg. For the purpose of the present application, a low Tg is a Tg of less than or equal to 0° C. Such a low Tg generally allows for the copolymers to behave as pressure sensitive adhesives.

The adhesive compositions may be a pressure sensitive adhesive. Pressure sensitive adhesives (PSAs) are well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power.

The adhesive composition is non-aqueous. Generally, this allows for a composition of 100% solids or non-aqueous solvent blends. Surfactants are therefore also generally not present in the adhesive composition. In some embodiments, the composition is hot melt processable, for example by extrusion.

Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those such as acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof.

Acidic monomers of the present invention are typically the ethylenically unsaturated carboxylic acids. When even stronger acids are desired, acidic monomers include the ethylenically unsaturated sulfonic acids and ethylenically unsaturated phosphonic acids. Sulfonic and phosphonic acids generally provide a stronger interaction with a basic polymer. This stronger interaction can lead to greater improvements in cohesive strength, as well as higher temperature resistance and solvent resistance of the adhesive.

The basic monomer of the present application may comprise amide functionality. The basic monomer may also comprise amino or other nitrogen containing functionality. Exemplary basic monomers include N,N dimethyl (meth)acrylamide (NNDMA); N,N-diethyl (meth)acrylamide; N,N-dimethylaminopropyl methacrylamide (DMAPMAm); N,N-diethylaminopropyl methacrylamide (DEAPMAm); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N-vinyl formamide, (meth)acrylamide; N-methyl acrylamide, N-ethyl acrylamide; N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, and mixtures thereof.

The polymers herein can be prepared by any conventional free radical polymerization method, including solution, radiation, bulk, dispersion, emulsion, and suspension processes. In one solution polymerization method, the monomers, along with a suitable inert organic solvent, are charged into a four-neck reaction vessel that is equipped with a stirrer, a thermometer, a condenser, an addition funnel, and a temperature controller.

In order to increase cohesive strength of the coated adhesive composition, a crosslinking additive may be incorporated into the blend.

Following copolymerization, other additives may be added to the resultant adhesive composition provided the additive causes no adverse affect to the desired properties, such as optical clarity and environmental stability over time. For example, compatible tackifiers and/or plasticizers may be added to aid in optimizing the ultimate tack and peel properties of the PSA. The use of such tack-modifiers is common in the art, as is described in the Handbook of Pressure Sensitive Adhesive Technology, edited by Donatas Satas (1982). Examples of useful tackifiers include, but are not limited to, rosin, rosin derivatives, polyterpene resins, coumarone-indene resins, and the like. Plasticizers which may be added to the adhesive of the invention may be selected from a wide variety of commercially available materials. In each case, the added plasticizer must be compatible with the PSA. Representative plasticizers include polyoxyethylene aryl ether, dialkyl adipate, 2-ethylhexyl diphenyl phosphate, t-butylphenyl diphenyl phosphate, 2-ethylhexyl adipate, toluenesulfonamide. dipropylene glycol dibenzoate, polyethylene glycol dibenzoate, polyoxypropylene aryl ether, dibutoxyethoxyethyl formal, and dibutoxyethoxyethyl adipate. UV stabilizers as known in the art may also be added.

The adhesive composition may be included in an adhesive article comprising a backing and an adhesive layer upon the backing. In some embodiments, the adhesive article additionally includes a release liner on the adhesive layer opposite the backing. The adhesive article may be manufactured using extrusion technology, including extrusion coating of the adhesive onto the liner or the backing or by coextruding a first extrudable feedstock in contact with a second extrudable feedstock to form a coextruded film. The first extrudable feedstock comprises the pressure sensitive adhesive. The second extrudable feedstock comprises a backing material or a release material. The coextruded film then comprises an adhesive layer comprising the pressure sensitive adhesive and either a backing layer or a release layer.

In some embodiments, additional feedstocks are added on one or both sides of the first or second feedstock. For example, a third extrudable feedstock may be used to make an adhesive layer comprising a backing, an adhesive layer and a release layer.

The backing layer may be, for example, a graphic film such as polyvinyl chloride or an olefinic graphic film substrate like that described in U.S. Pat. No. 6,589,636 (Emslander, et al.) or a tape backing such as ethylene acrylic acid copolymer or another layer comprising a release agent. Additional backing layers could include films used as labelstock, graphic protection films and antigraffiti films.

Coextrusion is a known method of manufacturing films. Coextrusion means, for the present application, the simultaneous melt processing of multiple molten streams and the combination of such molten streams into a single unified structure, or coextruded film, for example from a single extrusion die. Adhesive articles have been manufactured with extrusion technology as shown, for example, in U.S. Pat. No. 5,660,922 (coextruding double sided adhesive tapes) and U.S. Pat. No. 6,777,053. It is also known to extrude release material blends to form a release film. See, for example, U.S. Patent Application 2004-0127121.

The process is run generally by processing the feedstocks at or above their melt temperature through the die, resulting in the coextruded film. A coextruded film is generally a composite of all the molten feedstocks placed within the co-extrusion process. The resulting co-extruded films are generally multilayer. The layers are in contact with one another in the molten state. In certain embodiments, the layers are in contact throughout the extrusion, for example they are in contact as soon as they are molten.

The coextruded film may further be processed, for example by orientation. One example of orientation of a film is biaxial orientation. Biaxial orientation involves stretching the film in two directions perpendicular to each other, generally in the down-web direction and cross-web direction. In a typical operation, the freshly extruded molten film is fed onto a chill roll to produce a quenched amorphous film which is briefly heated and stretched in the down-web direction, and then conducted through a tenter frame where it is stretched transversely with moderate heating. Down-web direction stretching may be accomplished by passing between two sets of nip rolls, the second set rotating at a higher speed than the first.

The release layer comprises a release agent. The release layer may also comprise other polymers, blended with the release agent. Suitable release agent include, for example, this disclosed in (PCT Application Number US2009/068632) and in (PCT Application Number US2009/054322) incorporated herein by reference.

In some embodiments, at least the adhesive composition is subject to post extrusion processing, either in the coextruded film or after separation from the release liner. For example, the adhesive may be crosslinked.

EXAMPLES

These examples are merely for illustrative purposes only and are not meant to be limiting on the scope of the appended claims. All parts, percentages, ratios, etc. in the examples and the rest of the specification are by weight, unless noted otherwise.

TABLE 1

Monomers and Other Materials Used

| Trade Name or Abbreviation | Description | Manufacturer |
|---|---|---|
| 2EHA | 2-ethylhexyl acrylate | Dow Chemical Co. |
| MA | methyl acrylate | Dow Chemical Co. |
| BA | n-butyl acrylate | BASF Corporation |
| DMAEA | 2-(dimethylamino)ethyl acrylate | Jarchem Industries |
| AA | acrylic acid | Dow Chemical Co. |
| NNDMA | N,N-dimethyl acrylamide | Jarchem Industries |
| IOTG | iso-octyl thioglycolate, used as a chain transfer agent. | Evans Chemetics |
| Irgacure 651 | 2,2-dimethoxy-1,2-diphenyl-ethanone; used as a photo-initiator. | Ciba Chemicals (part of BASF) |
| ABP | 4-acryloxy benzophenone - a copolymerizable photocrosslinker | |
| Irganox 1076 | Mono-functional hindered phenolic anti-oxidant | Ciba Chemicals (part of BASF) |

Test Methods
180° Angle Peel Adhesion Strength Test.

The peel adhesion strength and removability were evaluated by the following method. Samples of adhesive coated vinyl film were cut into 1 in (2.54 cm) wide strips about 6 in long. These strips were reinforced by applying another piece of adhesive coated vinyl film (50 microns thick vinyl) to the vinyl side to prevent stretching during the peel test. These strips were applied to a painted aluminum test panel (prepared from painted aluminum coil stock supplied by Aluminum Line Products, Goshen, Ind. with the "Polar White" finish). Adhered samples were aged at 65° C. for 7 days and then allowed to return to a controlled room temperature (72° F., 50% relative humidity) before testing. The strips were peeled from the panel using an Instron universal testing machine with a crosshead speed of 12 in/min. The peel force was measured and the panels were observed to see if visible adhesive residue remained on the panel.

Preparation of Acrylic Polymers A and B of Table 2 and Table 3.

All of these polymers were produced by a bulk polymerization within a polymeric pouch initiated by ultraviolet radiation according to the method described in WO9607522. The photoinitiator used was a 2,2-dimethoxy-1,2-diphenyl-ethanone, available under the tradename IRGACURE 651 from Ciba Specialty Chemicals Incorporated, Tarrytown, N.Y. The antioxidant used was an octadecyl 3,5-di-(tert)-butyl-4-hydroxyhydrocinnamate, available under the tradename IRGANOX 1076 from Ciba Specialty Chemicals Incorporated, Tarrytown, N.Y.

Extrusion Compounding and Coating Procedure

The acrylic polymer compositions were used to prepare different blends compositions using a twin screw extruder. The Polymer A and Polymer B pouches were fed to separate ports on the twin screw extruder using two Bonnot™ extruders coupled with gear pumps to feed the two different polymers at a controlled ratio. The total extruder throughput was about 10 lb/hr (5 kg/hr). The screw speed was 180-200 rpm. The extruder was an 18 mm co-rotating twin screw extruder with a sequence of mixing and conveying sections, operating at a temperature of 350° F. (175° C.). The compounded mixture exiting the twin screw extruder was collected as a "rope" of adhesive on a release liner. The liner was wrapped around the adhesive rope to allow storage and transport of the adhesive composition. These compounded adhesive compositions were then reprocessed by feeding the rope to a single screw extruder with a ¾" diameter screw and extruded through a flat die to coat the adhesive between a release liner and a cast vinyl film having a thickness of 50 microns. The cast vinyl film had been previously primed by coating with a solution of an acrylic polymer modified with 2-methylaziridine in ethyl acetate.

TABLE 2

A Polymer Compositions

| A polymer ID | Monomers | Ratios | IOTG | ABP | Irgacure 651 | Irganox 1076 |
|---|---|---|---|---|---|---|
| A1 | 2EHA/AA | 90/10 | 0.03 | 0 | 0.15 | 0.4 |
| A2 | 2EHA/AA | 90/10 | 0.02 | 0 | 0.15 | 0.4 |
| A3 | 2EHA/AA | 90/10 | 0.01 | 0 | 0.15 | 0.4 |
| A4 | 2EHA/AA | 95/5 | 0.03 | 0 | 0.15 | 0.4 |
| A5 | 2EHA/BA/AA | 79/15/6 | 0.03 | 0 | 0.15 | 0.4 |
| A6 | 2EHA/AA | 90/10 | 0.02 | 0.10% | 0.15 | 0.4 |
| A7 | 2EHA/AA | 95/5 | 0.02 | 0.10% | 0.15 | 0.4 |

TABLE 3

B Polymer Compositions

| B polymer ID | Monomers | Ratios | IOTG | ABP | Irgacure 651 | Irganox 1076 |
|---|---|---|---|---|---|---|
| B1 | 2EHA/MA/NNDMA | 75/15/10 | 0.02 | | 0.15 | 0.4 |
| B2 | 2MBA/NNDMA | 90/10 | 0.02 | 0.1 | 0.15 | 0.4 |
| B3 | 2EHA/DMAEA | 95/5 | 0.03 | | 0.15 | 0.4 |
| B4 | 2EHA/DMAEA | 98/2 | 0.03 | | 0.15 | 0.4 |

TABLE 4

Blend compositions and performance

| Blend Patent Example | A polymer ID | % acid in A polymer | B polymer ID | % base in B polymer | A polymer % | B polymer % | Adhesive transfer to panel | Adhesion 7d65C N/dm | Moles acid per kg | Moles base per kg | Moles acid-base pairs per kg |
|---|---|---|---|---|---|---|---|---|---|---|---|
| 1 | A1 | 10% | none | 0% | 100% | 0% | Yes | 176 | 1.39 | 0.00 | 0.00 |
| 2 | A2 | 10% | none | 0% | 100% | 0% | Yes | 178 | 1.39 | 0.00 | 0.00 |
| 3 | A3 | 10% | none | 0% | 100% | 0% | Yes | 142 | 1.39 | 0.00 | 0.00 |
| 4 | A1 | 10% | B4 | 2% | 50% | 50% | Yes | 139 | 0.69 | 0.07 | 0.07 |
| 5 | A4 | 5% | B4 | 2% | 50% | 50% | Yes | 179 | 0.35 | 0.07 | 0.07 |
| 6 | A5 | 6% | B4 | 2% | 50% | 50% | Yes | 145 | 0.42 | 0.07 | 0.07 |
| 7 | A5 | 6% | B3 | 5% | 50% | 50% | No | 84 | 0.42 | 0.17 | 0.17 |
| 8 | A4 | 5% | B3 | 5% | 50% | 50% | No | 88 | 0.35 | 0.17 | 0.17 |
| 9 | A1 | 10% | B3 | 5% | 50% | 50% | No | 90 | 0.69 | 0.17 | 0.17 |
| 10 | A1 | 10% | B1 | 10% | 35% | 65% | No | 133 | 0.49 | 0.66 | 0.49 |
| 11 | A1 | 10% | B1 | 10% | 65% | 35% | No | 101 | 0.90 | 0.35 | 0.35 |
| 12 | A1 | 10% | B1 | 10% | 50% | 50% | No | 145 | 0.69 | 0.51 | 0.51 |
| 13 | A6 | 10% | B2 | 10% | 50% | 50% | No | 137 | 0.69 | 0.51 | 0.51 |
| 14 | A7 | 5% | B2 | 10% | 50% | 50% | No | 98 | 0.35 | 0.51 | 0.35 |

Calculation of concentration of acid-base pairs:

The number of moles of acid per kg of blend is calculated using the following formula:

(1000g×% A polymer×% acid in A polymer)/FW of acid monomer.

Similarly, the number of moles of base per kg of blend is calculated by:

(1000g×% B polymer×% base in B polymer)/FW of base monomer.

FW stands for the formula weight. The relevant formula weights are shown in Table 5.

TABLE 5

Formula weights of acid and base monomers

| Monomer | Formula Weight (FW) g/mol |
|---|---|
| Acrylic acid | 72 |
| N,N-dimethyl acrylamide | 99 |
| Dimethyl amino ethyl acrylate | 143 |

Various modifications and alterations of the present invention will become apparent to those skilled in the art without departing from the spirit and scope of the invention.

What is claimed is:

1. A non-aqueoas composition comprising a blend of:
    between 35-65 weight percent of an acidic copolymer derived from a first group of monomers comprising at least one acidic monomer and the acidic copolymer is substantially free of a basic monomer and includes between 5% by weight and less than 10% by weight of the acidic monomer; and
    between 35-65 weight percent of a basic copolymer derived from a second group of monomers comprising at least one basic monomer and the basic copolymer is substantially free of an acidic monomer and includes between 2% by weight and less than 10% by weight of the basic monomer,
    wherein the basic copolymer comprises an amide functionally, and
    wherein the acidic copolymer has a Tg that is less than 0° C. and
    wherein the basic copolymer has a Tg that is less than 0° C.; and
    wherein the composition comprises between 0.17 and 0.51 moles of acid/base pairs per kilogram of the composition.

2. The composition of claim 1, in a solvent blend.

3. The composition of claim 1, in a 100% solids blend.

4. The composition of claim 1, wherein the composition is hot melt processable.

5. The composition of claim 1, wherein the composition is a pressure sensitive adhesive.

6. The composition of claim 1, wherein the acidic copolymer is a (meth)acrylic copolymer.

7. The composition of claim 1, wherein the basic copolymer is a (meth)acrylic copolymer.

8. The composition of claim 1, wherein the composition comprises a chemical crosslinker.

9. The composition of claim 1, wherein the composition is free of crosslinker.

10. The composition of claim 1, wherein the composition is free of pigment.

11. The composition of claim 1, wherein the basic copolymer comprises an amino functionality.

12. The composition of claim 1, wherein the composition is substantially free of surfactant.

* * * * *

UNITED STATES PATENT AND TRADEMARK OFFICE
CERTIFICATE OF CORRECTION

PATENT NO.         : 8,791,207 B2
APPLICATION NO.    : 12/688476
DATED              : July 29, 2014
INVENTOR(S)        : Ronald Steelman et al.

It is certified that error appears in the above-identified patent and that said Letters Patent is hereby corrected as shown below:

In the Specification

Column 4
Lines 12-13, delete "toluenesulfonamide." and insert -- toluenesulfonamide, --, therefor.

Column 5
Line 12, delete "in" and insert -- in Attorney Docket Number 65043WO003 --, therefor.
Line 13, delete "in" and insert -- in Attorney Docket Number 64700WO003 --, therefor.

In the Claims

Column 7
Line 47, claim 1, delete "non-aqueoas" and insert -- non-aqueous --, therefor.

Column 8
Lines 24-25, claim 1, delete "functionally," and insert -- functionality, --, therefor.
Line 55, claim 12, before "free" delete "substantially".

Signed and Sealed this
Fourteenth Day of April, 2015

Michelle K. Lee
*Director of the United States Patent and Trademark Office*